United States Patent
Kim et al.

(10) Patent No.: US 12,534,738 B2
(45) Date of Patent: Jan. 27, 2026

(54) EXPRESSION CASSETTE INCLUDING INTRON FOR HIGH EXPRESSION OF PROTEIN OF INTEREST AND USE THEREOF

(71) Applicant: CELLTRION INC., Incheon (KR)

(72) Inventors: Man Su Kim, Incheon (KR); Min Soo Kim, Incheon (KR)

(73) Assignee: CELLTRION INC., Incheon (KR)

( * ) Notice: Subject to any disclaimer, the term of this patent is extended or adjusted under 35 U.S.C. 154(b) by 193 days.

(21) Appl. No.: 17/784,461

(22) PCT Filed: Dec. 21, 2020

(86) PCT No.: PCT/KR2020/018802
§ 371 (c)(1),
(2) Date: Jun. 10, 2022

(87) PCT Pub. No.: WO2021/125913
PCT Pub. Date: Jun. 24, 2021

(65) Prior Publication Data
US 2024/0287541 A1     Aug. 29, 2024

(30) Foreign Application Priority Data
Dec. 20, 2019 (KR) .......... 10-2019-0172454

(51) Int. Cl.
*C12N 15/85*     (2006.01)
*C07K 16/22*     (2006.01)

(52) U.S. Cl.
CPC .......... *C12N 15/85* (2013.01); *C07K 16/22* (2013.01); *C12N 2830/42* (2013.01); *C12N 2830/50* (2013.01)

(58) Field of Classification Search
CPC ............ C12N 15/85; C12N 2830/42; C12N 2830/50; C12N 15/63; C12N 15/67; C07K 16/22; C12P 21/00
(Continued)

(56) References Cited

U.S. PATENT DOCUMENTS

| | | |
|---|---|---|
| 7,846,687 B2 | 12/2010 | Thadium et al. |
| 2017/0044557 A1 | 2/2017 | Gasser et al. |
| 2018/0030496 A1* | 2/2018 | Goel ............ C12N 15/86 |

FOREIGN PATENT DOCUMENTS

| | | |
|---|---|---|
| CN | 101389763 A | 3/2009 |
| CN | 107250365 A | 10/2017 |

(Continued)

OTHER PUBLICATIONS

Choi T et al, "A Generic Intron Increases Gene Expression in Transgenic Mice", Molecular and Cellular Biology, vol. 11, No. 6, Jun. 1991, pp. 3070-3074.
(Continued)

*Primary Examiner* — Robert B Mondesi
*Assistant Examiner* — Benjamin Hall Easton
(74) *Attorney, Agent, or Firm* — BakerHostetler

(57) ABSTRACT

The present invention relates to an expression cassette comprising an intron, for high expression of a protein of interest, and use thereof. More particularly, the present invention relates to an expression cassette comprising an intron sequence, a vector and transformant including same, and a method for preparing a protein of interest using same. The protein-of-interest expression cassette according to the present invention has the effect of inducing high expression of a protein of interest through a single transduction.

13 Claims, 4 Drawing Sheets
Specification includes a Sequence Listing.

(58) Field of Classification Search
USPC .................................................. 435/69.6
See application file for complete search history.

(56) References Cited

FOREIGN PATENT DOCUMENTS

| KR | 101076602 B | 10/2011 |
| KR | 10-2019-0040920 A | 4/2019 |
| KR | 10-2019-0092834 A | 8/2019 |
| KR | 1020190132626 | 11/2019 |
| KR | 1020190132702 | 11/2019 |
| WO | 2014077863 A1 | 5/2014 |

OTHER PUBLICATIONS

Richard D. Palmiter et al., "Heterologous introns can enhance expression of transgenes in mice", Proc. Natl. Acad. Sci. USA, vol. 88, Jan. 1991, pp. 478-482.

T. Maniatis et al., "Strategies for Cloning in Plasmid Vectors", Molecular Cloning: A laboratory manual, Cold Spring Harbor Laboratory Press, Cold Spring Harbor, New York, 1989, p. 1.52-1.110.

International Search Report from PCT/KR2020/018802 as prepared by the ISA/KR; mailed Mar. 31, 2021.

"A minimal cytomegalovirus intron A variant can improve transgene expression in different mammalian cell lines;" Quilici, L.S. et al.; Biotechnology Letter, 2013; vol. 35, No. 1, pp. 21-27.

"Human cytomegalovirus (HCMV) major immediate-early protein (IE) gene," complete cds.; Aug. 2, 1993; NCBI GenBank ID: M21295.1.

"Effect of intron A from human cytomegalovirus (Towne) immediate-early gene on heterologous expression in mammalian cells" Nucleic Acids Research; 1991; vol. 19, No. 14, pp. 3979-3986; Barbara S. Chapman et al.

"A Generic Intron Increases Gene Expression in Transgenic Mice;" American Society for Microbiology; Molecular and Cellular Biology; Jun. 1991; pp. 3070-3074; Ted Choi et al.

"Heterologous introns can enhance expression of transgenes in mice;" Proc. Natl. Acad. Sci. USA; vol. 88; pp. 478-482; Jan. 1991; Richard D. Palmiter et al.

Robert Simari et al.; "Original Articles Requirements for Enhanced Transgene Expression by Untranslated Sequences from the Human Cytomegalovirus Immediate-Early Gene"; Molecular Medicine Molecular Medicine, vol. 4; No. 0; Nov. 1, 1998; pp. 700-706.

Kaiping Gao et al.; "Human branch point consensus sequence is yUnAy"; Nucleic Acids Research; vol. 36; No. ; Feb. 19, 2008; pp. 2257-2267.

Orit Shaul; "How introns enhance gene expression"; International Journal of Biochemistry and Cell Biology; vol. 91; Jul. 1, 2017; pp. 145-155.

* cited by examiner (A)

(B)

(A)

(B)

SEQUENCE LISTING

```
<160> NUMBER OF SEQ ID NOS: 23

<210> SEQ ID NO 1
<211> LENGTH: 115
<212> TYPE: DNA
<213> ORGANISM: Artificial Sequence
<220> FEATURE:
<223> OTHER INFORMATION: CMV intronA partial sequence (including
      splicing donor)

<400> SEQUENCE: 1
```
ggaacggtgc attggaacgc ggattccccg tgccaagagt gacgtaagta ccgcctatag    60
agtctatagg cccaccccct tggcttctta tgcatgctat actgttttg gcttg         115

<210> SEQ ID NO 2
<211> LENGTH: 203
<212> TYPE: DNA
<213> ORGANISM: Artificial Sequence
<220> FEATURE:
<223> OTHER INFORMATION: Linker-SacII-CMV intronA partial sequence

<400> SEQUENCE: 2
gtttagtgaa ccgtcagatc gcctggagac gccatccacg ctgttttgac ctccatagaa    60
gacaccggga ccgatccagc ctccgcgggg aacggtgcat tggaacgcgg attccccgtg   120
ccaagagtga cgtaagtacc gcctatagag tctataggcc caccccttg gcttcttatg   180 catgctatac tgttttggc ttg                                            203

<210> SEQ ID NO 3
<211> LENGTH: 30
<212> TYPE: DNA
<213> ORGANISM: Artificial Sequence
<220> FEATURE:
<223> OTHER INFORMATION: splicing donor

<400> SEQUENCE: 3
cgtgccaaga gtgacgtaag taccgcctat                                     30

<210> SEQ ID NO 4
<211> LENGTH: 7
<212> TYPE: DNA
<213> ORGANISM: Artificial Sequence
<220> FEATURE:
<223> OTHER INFORMATION: branch sequence1

<400> SEQUENCE: 4 tactaac                                                               7

<210> SEQ ID NO 5
<211> LENGTH: 7
<212> TYPE: DNA
<213> ORGANISM: Artificial Sequence
<220> FEATURE:
<223> OTHER INFORMATION: branch sequence2

<400> SEQUENCE: 5 tgctaac                                                               7

<210> SEQ ID NO 6
<211> LENGTH: 7
<212> TYPE: DNA
<213> ORGANISM: Artificial Sequence
<220> FEATURE:
<223> OTHER INFORMATION: branch sequence3

<400> SEQUENCE: 6 tgctgac                                                               7

<210> SEQ ID NO 7
<211> LENGTH: 32
<212> TYPE: DNA
<213> ORGANISM: Artificial Sequence
<220> FEATURE:
<223> OTHER INFORMATION: EEI1 polyY+splicing acceptor

```
<400> SEQUENCE: 7
agtggttcaa agttttttc ttccatttca gg                                      32

<210> SEQ ID NO 8
<211> LENGTH: 35
<212> TYPE: DNA
<213> ORGANISM: Artificial Sequence
<220> FEATURE:
<223> OTHER INFORMATION: EEI2 polyY+splicing acceptor

<400> SEQUENCE: 8
ctttcccttt ctctcctctc ctctcctctc ccagg                                  35

<210> SEQ ID NO 9
<211> LENGTH: 45
<212> TYPE: DNA
<213> ORGANISM: Artificial Sequence
<220> FEATURE:
<223> OTHER INFORMATION: EEI3 polyY+splicing acceptor

<400> SEQUENCE: 9
catgttcatg cctttttttt tttttacag gtcctgggca acgtg                        45

<210> SEQ ID NO 10
<211> LENGTH: 35
<212> TYPE: DNA
<213> ORGANISM: Artificial Sequence
<220> FEATURE:
<223> OTHER INFORMATION: EEI4 polyY+splicing acceptor

<400> SEQUENCE: 10
caatctcttt acccacccac aggcagaccg aaggc                                  35

<210> SEQ ID NO 11
<211> LENGTH: 35
<212> TYPE: DNA
<213> ORGANISM: Artificial Sequence
<220> FEATURE:
<223> OTHER INFORMATION: EEI2 polyY+splicing acceptor (original
      sequence)

<400> SEQUENCE: 11
ctttgccttt ctctccacag gtgtccactc ccagg                                  35

<210> SEQ ID NO 12
<211> LENGTH: 45
<212> TYPE: DNA
<213> ORGANISM: Artificial Sequence
<220> FEATURE:
<223> OTHER INFORMATION: EEI3' polyY+splicing acceptor (original
      sequence)

<400> SEQUENCE: 12
catgttcatg ccttcttctt tttcctacag ctcctgggca acgtg                       45

<210> SEQ ID NO 13
<211> LENGTH: 131
<212> TYPE: DNA
<213> ORGANISM: Artificial Sequence
<220> FEATURE:
<223> OTHER INFORMATION: SV40 polyA

<400> SEQUENCE: 13
aacttgttta ttgcagctta taatggttac aaataaagca atagcatcac aaatttcaca       60
aataaagcat ttttttcact gcattctagt tgtggtttgt ccaaactcat caatgtatct      120
```
tatcatgtct g                                                               131

<210> SEQ ID NO 14
<211> LENGTH: 225
<212> TYPE: DNA
<213> ORGANISM: Artificial Sequence
<220> FEATURE:
<223> OTHER INFORMATION: BGH polyA

<400> SEQUENCE: 14
ctgtgccttc tagttgccag ccatctgttg tttgcccctc cccgtgcct tccttgaccc      60 tggaaggtgc cactcccact gtcctttcct aataaaatga ggaaattgca tcgcattgtc     120
tgagtaggtg tcattctatt ctggggggtg gggtggggca ggacagcaag ggggaggatt    180
gggaagacaa tagcaggcat gctggggatg cggtgggctc tatgg                     225

<210> SEQ ID NO 15
<211> LENGTH: 588
<212> TYPE: DNA
<213> ORGANISM: Artificial Sequence
<220> FEATURE:
<223> OTHER INFORMATION: CMV promoter sequence (588bp)

<400> SEQUENCE: 15
gttgacattg attattgact agttattaat agtaatcaat tacggggtca ttagttcata      60
gcccatatat ggagttccgc gttacataac ttacggtaaa tggcccgcct ggctgaccgc    120
ccaacgaccc ccgcccattg acgtcaataa tgacgtatgt tcccatagta acgccaatag    180
ggactttcca ttgacgtcaa tgggtggagt atttacggta aactgcccac ttggcagtac    240
atcaagtgta tcatatgcca agtacgcccc ctattgacgt caatgacggt aaatggcccg    300
cctggcatta tgcccagtac atgaccttat gggactttcc tacttggcag tacatctacg    360
tattagtcat cgctattacc atggtgatgc ggttttggca gtacatcaat gggcgtggat    420
agcggtttga ctcacgggga tttccaagtc tccaccccat tgacgtcaat gggagtttgt    480
tttggcacca aaatcaacgg gactttccaa aatgtcgtaa caactccgcc ccattgacgc    540
aaatgggcgg taggcgtgta cggtgggagg tctatataag cagagctc                  588

<210> SEQ ID NO 16
<211> LENGTH: 82
<212> TYPE: DNA
<213> ORGANISM: Artificial Sequence
<220> FEATURE:
<223> OTHER INFORMATION: Linker (82bp)

<400> SEQUENCE: 16
gtttagtgaa ccgtcagatc gcctggagac gccatccacg ctgttttgac ctccatagaa     60
gacaccggga ccgatccagc ct                                              82

<210> SEQ ID NO 17
<211> LENGTH: 6
<212> TYPE: DNA
<213> ORGANISM: Artificial Sequence
<220> FEATURE:
<223> OTHER INFORMATION: SacII restrict enzyme site

<400> SEQUENCE: 17 ccgcgg                                                                 6

<210> SEQ ID NO 18

```
<211> LENGTH: 12
<212> TYPE: DNA
<213> ORGANISM: Artificial Sequence
<220> FEATURE:
<223> OTHER INFORMATION: HpaI/Kozak sequence

<400> SEQUENCE: 18
gttaacgcca cc                                                          12

<210> SEQ ID NO 19
<211> LENGTH: 1377
<212> TYPE: DNA
<213> ORGANISM: Artificial Sequence
<220> FEATURE:
<223> OTHER INFORMATION: aflibercept(GOI)

<400> SEQUENCE: 19
atggtttctt actgggacac cggcgttctg ctgtgcgctc tgctgtcttg tctgctgctg      60
accggctcct cttctggctc tgataccggc agacccttcg tggaaatgta cagcgagatc     120
cccgagatca tccacatgac cgagggcaga gagctggtca tccccctgta gagtgacctct   180 cctaacatca ccgtgacact gaagaagttc cctctggaca cactgatccc cgacggcaag     240
agaatcatct gggactcccg aagggcttc atcatctcca cgccaccta caaagagatc      300 ggcctgctga cctgcgaggc taccgtgaat ggccacctgt acaagaccaa ctatctgacc     360
cacagacaga ccaacaccat catcgacgtg gtgctgagcc cttctcacgg cattgaactg     420
tccgtgggag agaagctggt gctgaactgt accgccagaa ccgagctgaa cgtgggcatc     480
gacttcaact gggagtaccc cagctccaag caccagcaca agaaactggt caaccgggac     540
ctgaaaaccc agtccggctc cgagatgaag aaattcctga gcaccctgac catcgacggc     600
gtgaccagat ctgatcaggg cctgtatacc tgcgccgctt cctctggcct gatgaccaag     660
aaaaactcca ccttcgtgcg ggtgcacgag aaggacaaga cccacacatg tcctccatgt     720
cctgctccag aactgctcgg cggaccctct gtgttcctgt ttcctccaaa gcctaaggac     780
accctgatga tctctcggac ccctgaagtg acctgcgtgg tggtggatgt gtctcacgag     840
gatcccgaag tgaagttcaa ttggtacgtg gacggcgtgg aagtgcacaa cgccaagacc     900
aagcctagag aggaacagta caacagcacc tacagagtgg tgtccgtgct gaccgtgctg     960
caccaggatt ggctgaacgg caaagagtac aagtgcaagg tgtccaacaa ggccctgcct    1020
gctcctatcg aaaagaccat cagcaaggct aagggccagc ctcgggaacc tcaggtttac    1080
acactgcctc catctcggga cgagctgaca aagaatcagg tgtccctgac ctgcctggtc    1140
aagggcttct acccttccga tatcgccgtg gaatgggagt ccaatggcca gcctgagaac    1200
aactacaaga caccccctcc tgtgctggac tccgacggct cattcttcct gtactccaag    1260
ctgacagtgg acaagtctcg gtggcagcag ggcaacgtgt tctcctgttc tgtgatgcac    1320
gaggccctgc acaaccacta cacccagaag tccctgtctc tgtcccctgg caaatga       1377

<210> SEQ ID NO 20
<211> LENGTH: 241
<212> TYPE: DNA
<213> ORGANISM: Artificial Sequence
<220> FEATURE:
<223> OTHER INFORMATION: EEI1 intron sequence (Expression enhancing
      sequence 1)
```

```
<400> SEQUENCE: 20
gtttagtgaa ccgtcagatc gcctggagac gccatccacg ctgttttgac ctccatagaa      60
gacaccggga ccgatccagc ctccgcgggg aacggtgcat tggaacgcgg attccccgtg     120
ccaagagtga cgtaagtacc gcctatagag tctataggcc cacccccttg gcttcttatg     180
catgctatac tgttttggc ttgtactaac agtggttcaa agttttttc ttccatttca      240 g                                                                    241

<210> SEQ ID NO 21
<211> LENGTH: 245
<212> TYPE: DNA
<213> ORGANISM: Artificial Sequence
<220> FEATURE:
<223> OTHER INFORMATION: EEI2 intron sequence (Expression enhancing
      sequence 2)

<400> SEQUENCE: 21
gtttagtgaa ccgtcagatc gcctggagac gccatccacg ctgttttgac ctccatagaa      60
gacaccggga ccgatccagc ctccgcgggg aacggtgcat tggaacgcgg attccccgtg     120
ccaagagtga cgtaagtacc gcctatagag tctataggcc cacccccttg gcttcttatg     180
catgctatac tgttttggc ttgtactaac ctttcccttt ctctcctctc ctctcctctc     240
ccagg                                                                245

<210> SEQ ID NO 22
<211> LENGTH: 255
<212> TYPE: DNA
<213> ORGANISM: Artificial Sequence
<220> FEATURE:
<223> OTHER INFORMATION: EEI3 intron sequence (Expression enhancing
      sequence 3)

<400> SEQUENCE: 22
gtttagtgaa ccgtcagatc gcctggagac gccatccacg ctgttttgac ctccatagaa      60
gacaccggga ccgatccagc ctccgcgggg aacggtgcat tggaacgcgg attccccgtg     120
ccaagagtga cgtaagtacc gcctatagag tctataggcc cacccccttg gcttcttatg     180
catgctatac tgttttggc ttgtgctaac catgttcatg cctttttttt tttttacag     240 gtcctgggca acgtg                                                      255

<210> SEQ ID NO 23
<211> LENGTH: 245
<212> TYPE: DNA
<213> ORGANISM: Artificial Sequence
<220> FEATURE:
<223> OTHER INFORMATION: EEI4 intron sequence (Expression enhancing
      sequence 4)

<400> SEQUENCE: 23
gtttagtgaa ccgtcagatc gcctggagac gccatccacg ctgttttgac ctccatagaa      60
gacaccggga ccgatccagc ctccgcgggg aacggtgcat tggaacgcgg attccccgtg     120
ccaagagtga cgtaagtacc gcctatagag tctataggcc cacccccttg gcttcttatg     180
catgctatac tgttttggc ttgtgctgac caatctcttt acccacccac aggcagaccg     240
aaggc                                                                245
```

US 12,534,738 B2

EXPRESSION CASSETTE INCLUDING INTRON FOR HIGH EXPRESSION OF PROTEIN OF INTEREST AND USE THEREOF

CROSS-REFERENCE TO RELATED APPLICATIONS

This application is a National Stage of International Patent Application No. PCT/KR2020/018802, filed Dec. 21, 2020, and claims the priority of Korean Patent Application No. 10-2019-0172454, filed Dec. 20, 2019, the disclosures of which are incorporated herein by reference in their entirety.

REFERENCE TO SEQUENCE LISTING SUBMITTED VIA EFS-WEB

This application includes an electronically submitted sequence listing in .txt format. The .txt file contains a sequence listing entitled "2022-11-28087248.003980_ST25.txt" created on Nov. 28, 2022, and is 9,537 bytes in size. The sequence listing contained in this .txt file is part of the specification and is hereby incorporated by reference herein in its entirety.

TECHNICAL FIELD

The present invention relates to an expression cassette including an intron for high expression of a protein of interest and the use thereof.

BACKGROUND ART

Production of proteins of interest, particularly therapeutic proteins, using animal cells, is currently widely used. Due to a series of processes specific to animal cells, such as glycosylation and phosphorylation, proteins having normal biological activity are often produced only when animal cells are used. However, this method using animal cells has a higher production cost than a method using microorganisms, and thus increasing productivity is extremely important from a commercial point of view.

The gene transcription level of a protein of interest has a great influence on the expression level of the protein and determines the production of the protein of interest. This gene transcription level is affected mainly by the components of an expression cassette composed of a promoter/enhancer, a gene sequence of a protein of interest, a poly A signal sequence, and the like.

In order to commercially produce a protein of interest in high yield, a promoter/enhancer having strong transcriptional activity may be used, or finding a poly A sequence optimal for high-yield production may also be performed. Alternatively, an effort has been attempted to enhance expression by additionally inserting a foreign gene (amplification gene, siRNA, etc.) or knocking out an existing endogenous gene (US Patent Publication No. 10-2017-0044557).

Since inducing enhanced expression of a protein of interest by an intron sequence was reported (Choi T et al., Mol Cell Biol, 11, 3070-3074 (1991); and Palmiter R D et al., Proc Natl Acad Sci USA, 88, 478-482 (1991)), expression cassettes in which a specific promoter/enhancer and a specific intron sequence are combined with each other for the purpose of inducing stable and robust expression have been reported.

However, not all intron sequences induce enhanced expression, and in order to induce enhanced expression, not only a splicing mechanism induced by an intron sequence, but also the intron sequence itself should be able to induce enhanced expression, and a combination of the promoter/enhancer and the intron sequence is also important. Thus, in order to induce enhanced expression using an intron sequence, a process of discovering an intron having a sequence capable of increasing expression in combination with a promoter/enhancer is required.

However, even in the case of humans alone, numerous intron sequences exist to the extent that introns occupy about 26% of the entire genome, and it can be a very difficult task to investigate the numerous intron sequences and to find the optimal intron sequence capable of inducing increased expression in combination with a promoter/enhancer, among these intron sequences.

The present inventors have tried to solve the problem by creating a novel intron sequence capable of inducing increased expression, rather than finding an intron sequence to induce increased expression in combination with a promoter/enhancer.

DISCLOSURE

Technical Problem

Under this background, the present inventors have developed a novel intron sequence capable of inducing increased expression, and a method for preparing the same, and have found that a combination of a promoter/enhancer, an intron, a polyA signal sequence, and the like can highly express a protein of interest, thereby completing the present invention.

An object of the present invention is to provide an expression-enhancing intron comprising an expression-enhancing sequence.

Another object of the present invention is to provide an expression cassette for producing a protein of interest comprising a promoter, an intron sequence, a polynucleotide encoding the protein of interest, and a poly A sequence, for high expression of the protein of interest.

Still another object of the present invention is to provide a vector containing an expression cassette for producing a protein of interest.

Yet another object of the present invention is to provide a transformant comprising an expression cassette for producing a protein of interest.

Still yet another object of the present invention is to provide a method for producing a protein of interest comprising a step of culturing a transformant comprising an expression cassette for producing the protein of interest.

Technical Solution

To achieve the above objects, the present invention provides an expression-enhancing intron comprising an expression-enhancing sequence represented by SEQ ID NO: 1.

In one embodiment of the present invention, the intron sequence may comprise a splicing donor, a branch, a poly Y sequence, and a splicing acceptor.

In one embodiment of the present invention, the splicing donor sequence may be represented by SEQ ID NO: 3, the branch sequence may be represented by any one selected from among SEQ ID NOs: 4 to 6, and the polyY sequence and the splicing acceptor may be represented by any one selected from among SEQ ID NOs: 7 to 12.

In one embodiment of the present invention, the expression-enhancing intron sequence may be any one selected from the group consisting of SEQ ID NOs: 20 to 23.

The present invention also provides an expression cassette for producing a protein of interest comprising a promoter, an expression-enhancing intron sequence, a polynucleotide encoding the protein of interest, and a polyA sequence, wherein the intron sequence comprises an expression-enhancing sequence.

In one embodiment of the present invention, the expression-enhancing sequence may be represented by SEQ ID NO: 1.

In one embodiment of the present invention, one or more expression-enhancing introns may be present on a single protein-of-interest expression cassette.

In one embodiment of the present invention, the expression-enhancing intron may comprise an intron sequence at one or more positions selected from the group consisting of the following positions: a) between the promoter and the polynucleotide encoding the protein of interest; b) between the polynucleotide encoding the protein of interest and the poly A; and c) inside the polynucleotide encoding the protein of interest.

In one embodiment of the present invention, the promoter may be a CMV promoter.

In one embodiment of the present invention, the protein of interest may be an antibody or a fragment thereof.

In one embodiment of the present invention, the poly A sequence may be SEQ ID NO: 13 or 14.

In one embodiment of the present invention, the expression cassette for producing the protein of interest may have an effect of highly expressing the protein of interest through intron splicing regulation.

The present invention also provides a vector containing an expression cassette for producing a protein of interest.

The present invention also provides a transformant transformed with a vector containing an expression cassette for producing a protein of interest.

In one embodiment of the present invention, the transformant may be a eukaryotic cell.

The present invention also provides a method for producing a protein of interest comprising a step of culturing a transformant comprising an expression cassette for producing the protein of interest.

The present invention also provides a method for increasing the production of a protein of interest.

Advantageous Effects

An intron sequence inducing high expression may be easily prepared through the intron sequence preparation method provided in the present invention. In addition, a sequence, which has high transcriptional activity but could not be used due to poor translational activity, may be used for expression enhancement. An expression cassette made by combining the prepared intron sequence for inducing high expression with a promoter/enhancer and a poly A signal sequence may be effectively used in the production of a protein of interest in animal cells.

MODE FOR INVENTION

Figure 1:
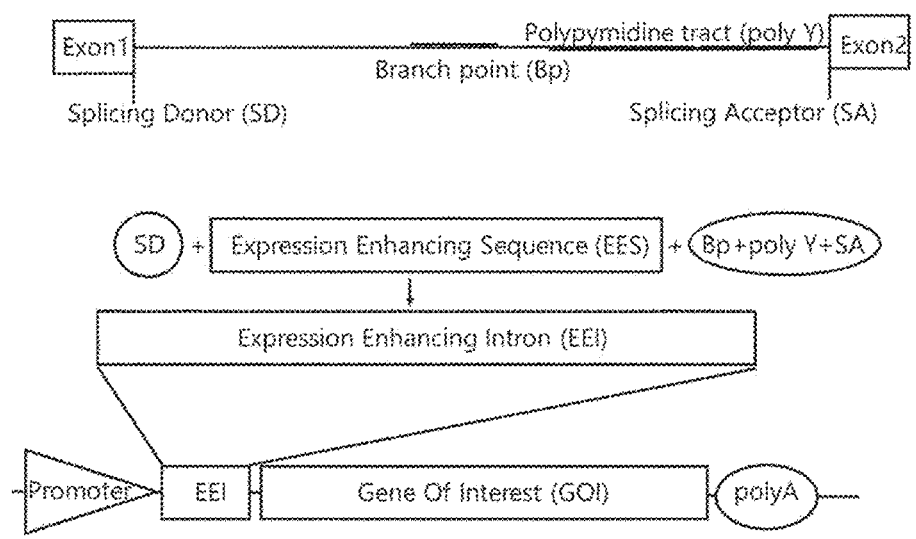
FIG. 1 is a schematic view illustrating the basic structure of an intron sequence (EEI) (SD+EES+Bp+PolyY+SA); and the structure of an expression cassette comprising the same (promoter+EEI+GOI+poly A).

The present invention relates to an expression cassette including an intron for high expression of a protein of interest and the use thereof. More specifically, the present invention relates to an expression cassette comprising an intron sequence, a vector and transformant comprising the same, and a method of producing a protein of interest using the same. The expression cassette for a protein of interest according to the present invention has an effect of inducing high expression of a protein of interest by increasing transcription of the protein of interest through one-time transduction, promoting mRNA export out of the nucleus, increasing the efficiency of translation of the protein of interest, and reducing transcription-associated genome instability.

In order to facilitate the understanding of the present invention, the terms used in the present invention are defined below.

"Promoter (or promoter/enhancer)" is a DNA sequence in which the binding sites of various transcription factors and the TATA box exist and to which RNA polymerase binds and from which mRNA synthesis starts.

"Intron sequence" refers to a partial RNA sequence that is removed in a process in which DNA is transcribed into mature RNA.

"Protein of interest" refers to a protein to be produced.

"PolyA signal sequence" induces a sequence of consecutive adenylic acid residues at the 3' end of mRNA, and contributes to mRNA stabilization.

"Expression cassette" refers to a unit cassette comprising a promoter and a protein of interest and capable of expressing a protein of interest for production of the protein of interest. The expression cassette may include therein various factors that can help the efficient production of a protein of interest. More specifically, the expression cassette may comprise a promoter, a polynucleotide encoding a protein of interest, and a poly A sequence.

"Expression-enhancing sequence (EES)" refers to a nucleotide sequence that increases expression, and more specifically, it may be a portion of the sequence of intron A comprising a CMV IE gene or a splicing donor.

"Expression-enhancing intron (EEI)" is a sequence obtained by combining the expression-enhancing sequence (EES) with a splicing donor (SD), a branch, a polypyrimidine tract (polyY), and a splicing acceptor (SA), which are intron sequence elements.

"Splicing donor (SD)" and "splicing acceptor (SA)" are sequences that are recognized as an intron through binding to the spliceosome complex. The splicing donor is located at the 5' end of the intron, and the splicing acceptor is located at the 3' end of the intron. "Polypyrimidine tract (polyY)" binds to U2AF and polypyrimidine tract-binding protein, which are components of the spliceosome, and is involved in intron recognition. "Branch" contains the nucleotide adenine and is involved in formation of a lariat structure during a splicing process.

Usually, the splicing donor has a sequence of AG_GTRAGU (R: A or G), the splicing acceptor has a sequence of YYNCAG_G (Y: C or T, N: A or G or C or T), and the polypyrimidine tract (poly Y) has a sequence of about 10 to 20 consecutive pyrimidines (C or T), and the branch has a characteristic sequence such as YURAC. In addition to these characteristic sequences, they may have any sequences that can be spliced.

Various aspects of the present invention are described in further detail herein.

The present invention provides an expression-enhancing intron comprising an expression-enhancing sequence represented by SEQ ID NO: 1.

The expression-enhancing intron of the present invention may comprise a splicing donor, a branch, a polypyrimidine tract (polyY), and a splicing acceptor.

The splicing donor is any sequence located at the 5' end of the intron that binds to the spliceosome complex, and among the splicing donors, the splicing donor sequence of CMV immediate early gene intron A may be preferred.

In one embodiment of the present invention, the expression-enhancing intron includes an expression-enhancing sequence containing a splicing donor therein, a branch, and a splicing acceptor, and it exhibits an expression-enhancing effect induced by a splicing mechanism, and an expression-enhancing effect induced by the expression-enhancing sequence.

The present invention provides an expression cassette for producing a protein of interest, wherein the splicing donor sequence is represented by SEQ ID NO: 3, the branch sequence is represented by any one selected from among SEQ ID NOs: 4 to 6, and the poly Y sequence and the splicing acceptor are represented by any one selected from among SEQ ID NOs: 7 to 12.

In one embodiment of the present invention, SEQ ID NO: 4 is a branch sequence derived from an elongation factor 1 alpha promoter/enhancer sequence or a human immunoglobulin sequence, SEQ ID NO: 5 is a branch sequence derived from a rabbit beta-globin sequence, and SEQ ID NO: 6 is a branch sequence derived from a mouse immunoglobulin sequence.

In one embodiment of the present invention, SEQ ID NO: 7 is a splicing acceptor sequence derived from an elongation factor 1 alpha promoter/enhancer sequence, SEQ ID NO: 8 is a modified splicing acceptor sequence derived from a human immunoglobulin sequence, SEQ ID NO: 9 is a modified splicing acceptor sequence derived from a rabbit beta-globin sequence, SEQ ID NO: 10 is a splicing acceptor sequence derived from a mouse immunoglobulin sequence, SEQ ID NO: 11 is a splicing acceptor sequence derived from a human immunoglobulin sequence, and SEQ ID NO: 12 is a splicing acceptor sequence derived from a rabbit beta-globin sequence.

The splicing acceptor of the present invention may more preferably be represented by any one selected from among SEQ ID NOs: 7 to 10.

The intron sequence of the present invention may be any one selected from the group consisting of SEQ ID NOs: 20 to 23. Specifically, the intron sequence EEI1 represented by SEQ ID NO: 20 is a combination of SEQ ID NOs: 1, 4 and 7, the intron sequence EEI2 represented by SEQ ID NO: 21 is a combination of SEQ ID NO: 1, 4 and 8, the intron EEI3 represented by SEQ ID NO: 22 is a combination of SEQ ID NOs: 1, 5 and 9, and the intron sequence EEI4 represented by SEQ ID NO: 23 is a combination of SEQ ID NOs: 1, 6 and 10. More specifically, the intron sequence EEI1 represented by SEQ ID NO: 20 is a combination of SEQ ID NOs: 2, 4 and 7, the intron sequence EEI2 represented by SEQ ID NO: 21 is a combination of SEQ ID NOs: 2, 4 and 8, the intron EEI3 represented by SEQ ID NO: 22 is a combination of SEQ ID NOs: 2, 5 and 9, and the intron sequence EEI4 represented by SEQ ID NO: 23 is a combination of SEQ ID NOs: 2, 6 and 10. For reference, SEQ ID NO: 2 is a nucleotide sequence in which a linker and a restriction enzyme site are added to SEQ ID NO: 1.

The present invention provides an expression cassette for a protein of interest comprising a promoter, an expression-enhancing intron, a polynucleotide encoding the protein of interest, and a poly A sequence. The intron sequence of the present invention may comprise an expression-enhancing intron (EEI).

The expression-enhancing intron of the present invention may comprise an expression-enhancing sequence. This expression-enhancing intron means any sequence that is located around the promoter/enhancer and can increase transcription and translation activity. Specifically, it may be a portion of the sequence of CMV immediate early intron A. More specifically, it may be a sequence represented by SEQ ID NO: 1, and more specifically, it may be a sequence represented by SEQ ID NO: 2.

In one embodiment of the present invention, one or more intron sequences may be present on a single expression cassette for the protein of interest. The expression vector of the present invention contains one or more intron sequences to enhance expression of a protein of interest in animal cells.

In one embodiment of the present invention, the expression-enhancing intron may comprise an intron sequence at one or more positions selected from the group consisting of the following positions: a) between the promoter and the polynucleotide encoding the protein of interest; b) between the polynucleotide encoding the protein of interest and the poly A; and c) inside the polynucleotide encoding the protein of interest. The intron sequence may be located between the promoter and the polynucleotide encoding the protein of interest. Since the intron sequence exhibits an expression-enhancing effect by interaction with the promoter located at the 5' end, it may be advantageously located between the promoter and the protein of interest.

The promoter may be any promoter enabling the expression cassette of the present invention to function, but may preferably be a polII-based promoter. More preferably, it may be a cytomegalovirus (CMV) promoter or an hCMV promoter.

In one example of the present invention, a polII-based CMV promoter, which is known as one of the strongest promoters and can induce expression in various types of cells, was used. The promoter used in the expression cassette of the present invention is a cytomegalovirus immediate early gene promoter/enhancer known as GenBank Accession No. X03922.1, and may have the nucleotide sequence of SEQ ID NO: 15.

The promoter of the present invention may be further inserted into the end of the cassette to enhance expression of the protein of interest.

In one example of the present invention, it was confirmed that, when the CMV promoter was added to the end of poly A of the expression cassette, expression of the protein of interest was further enhanced.

The protein of interest may be any protein, but may preferably be an antibody or a fragment thereof. The antibody or fragment thereof may have specificity to any one target antigen selected from the group consisting of CD19, CD20, CD22, CD33, CD52, Her2/neu, EGFR, EpCAM, MUC1, GD3, CEA, CA125, HLA-DR, TNF-α, VEGF, integrin α4β IL-12, IL-23, anti-CD20 Mab, IL-6R, VEGF receptor kinase inhibitor, complement factor C5, IL-1 beta, Rank Ligand, VEGFR2 (KDR), IL-6, GD20, IL-5, PDGF-R α, CTLA-4, CD3, IL-17A, PD-L1, PD-1, BAFF, BLyS, Dabigatran, SLAMF7 (CD319), anti-interleukin-4 (IL-4), interleukin-13 (IL-13) Mab, *Bacillus anthracis* anthrax, CD25, *Clostridium difficile* toxin B, PCSK9, hemagglutinin (HA) of influenza virus, F protein of RSV (respiratory syncytial virus), G protein of RSV, IgE (immunoglobulin E), and G protein of Rabies virus.

In one embodiment of the present invention, the protein of interest may be aflibercept represented by SEQ ID NO: 19, but is not limited thereto.

The PolyA signal sequence used in the expression cassette of the present invention may be selected from the group consisting of a bovine growth hormone (BGH) Poly A signal sequence, a SV40-derived PolyA signal sequence, an HIV-1 poly A signal sequence, a β-globin poly A signal sequence, an HSV TK polyA signal sequence, and a polyomavirus polyA signal sequence. Among them, the SV40-derived polyA signal sequence or the BGH poly A signal sequence may be preferred, without being limited thereto. More preferably, it may be a poly A signal sequence represented by SEQ ID NO: 13 or 14.

In one embodiment of the present invention, the expression cassette for producing a protein of interest may, if necessary, comprise additional nucleotide sequences such as a linker, a restriction enzyme cleavage site and a Kozak nucleotide sequence within the range that does not affect the basic transcription and translation of the protein of interest. More specifically, for example, the expression cassette may comprise a linker represented by SEQ ID NO: 16, a SacII restriction enzyme cleavage site represented by SEQ ID NO: 17, an HpaI/Kozak nucleotide sequence represented by SEQ ID NO: 18, and the like.

The expression cassette for producing a protein of interest according to the present invention may regulate intron splicing, and may have any one or more effects selected from the group consisting of an effect of increasing transcription of the protein of interest, an effect of promoting mRNA export out of the nucleus, an effect of increasing the efficiency of translation of the protein of interest, an effect of reducing transcription-associated genome instability, and an effect of inducing high expression of the protein of interest.

Figure 2:
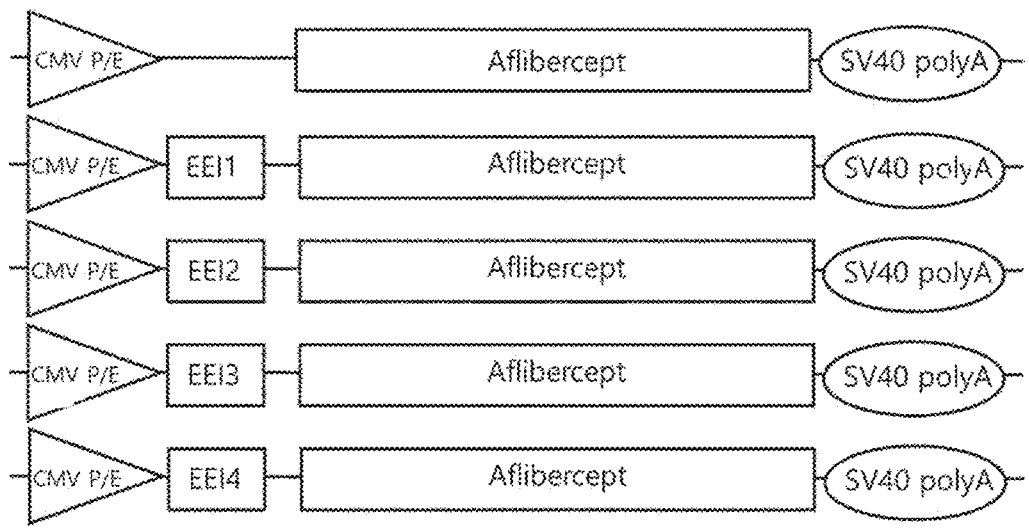
FIG. 2(A) is a schematic view illustrating an expression cassette composed of a cytomegalovirus (CMV) immediate early (IE) gene promoter/enhancer (CMV P/E), an intron sequence (EEI), aflibercept as a protein of interest, and simian virus 40 (SV40) poly A, according to an implementation of the present invention (control: an expression cassette not comprising EEI; EEI1: expression-enhancing intron 1 (SEQ ID NO: 7) obtained by combining elongation factor 1 alpha promoter/enhancer sequence-derived branch with a splicing acceptor sequence; EEI2: expression-enhancing intron 2 (SEQ ID NO: 8) obtained by combining a human immunoglobulin sequence-derived branch with a splicing acceptor sequence; EEI3: expression-enhancing intron 3 (SEQ ID NO: 9) obtained by combining a rabbit beta globin sequence-derived branch with a splicing acceptor sequence; EEI4: expression-enhancing intron 4 (SEQ ID NO: 10) obtained by combining a mouse immunoglobulin sequence-derived branch with a splicing acceptor sequence.
FIG. 2(B) is a graph comparing the amounts of aflibercept produced for a short period of time through transient expression in CHO-K1 cells using a control expression vector and expression vectors containing EEI1 to EEI4, respectively.
Figure 2:
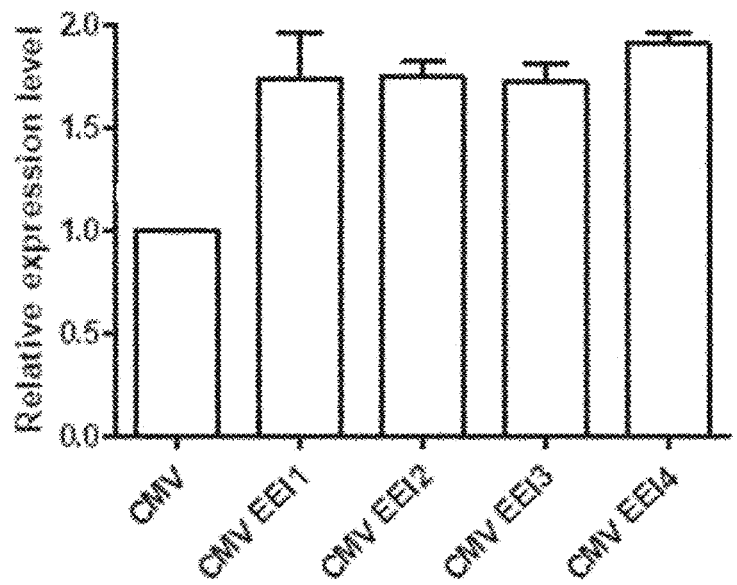
Figure 3:
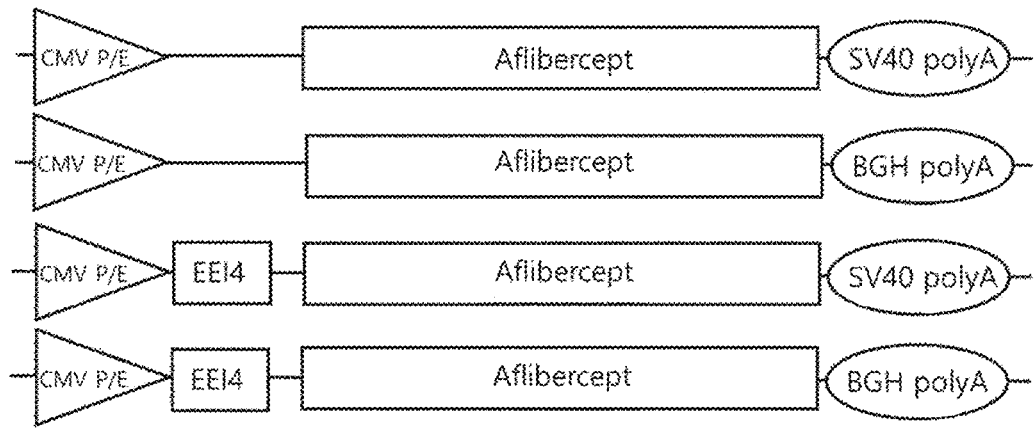
FIG. 3(A) is a schematic view illustrating an expression cassette composed of CMV P/E, aflibercept and SV40 polyA (CMV P/E+SV40 pA); an expression cassette composed of CMV P/E, aflibercept and BGH poly A (CMV P/E+BGH+ pA); an expression cassette composed of CMV P/E, EEI4, aflibercept and SV40 polyA (CMV P/E+EEI4+SV40 pA); and an expression cassette composed of CMV P/E, EEI4, aflibercept and BGH poly A (CMV P/E+EEI4+BGH pA).
FIG. 3(B) is a graph comparing the amounts of aflibercept produced for a short period of time through transient expression in CHO-K1 cells using expression vectors containing the four expression vectors, respectively.
Figure 3:
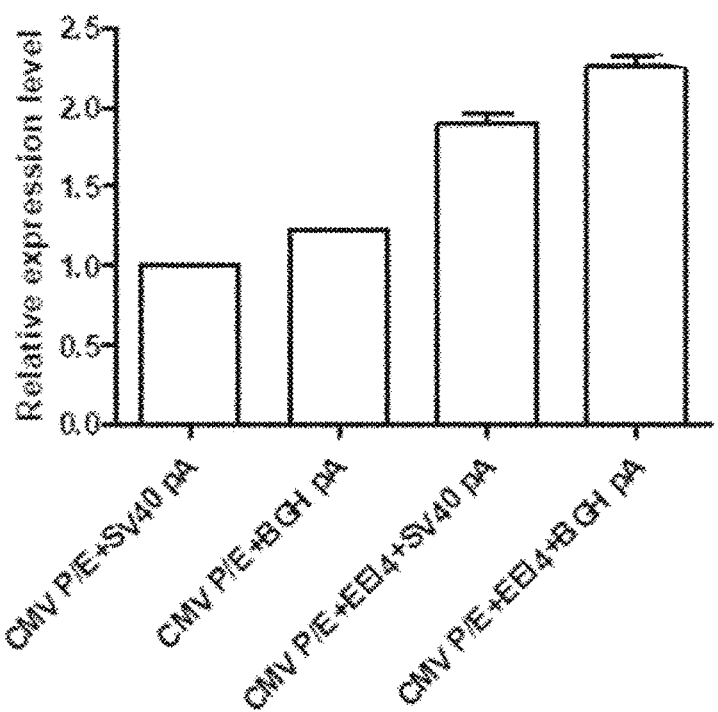

In one example of the present invention, it can be confirmed that, when the intron sequence is introduced, the expression level is increased by as little as 1.90 times to as much as 2.25 times compared to a control group in which the intron sequence is not introduced (see FIGS. 2 to 3 and Tables 1 and 2).

The present invention provides a vector containing the expression cassette for producing a protein of interest. The expression vector that is used for transduction may be any vector, but may preferably be a MarEx vector.

In one example of the present invention, as the vector, a pCT-EEI1 vector was constructed by cloning via PacI/HpaI sites into an MarEx vector (Korean Patent No. 10-1076602, hereinafter referred to as pCT) having dihydrofolate reductase (DHFR) as a selection marker.

The present invention provides a transformant transformed with a vector containing an expression cassette for production of a protein of interest. In one embodiment of the present invention, the transformant is a eukaryotic cell. Preferably, the eukaryotic cell is an animal cell, and the animal cell may be any type of cell that allows expression of a target gene, such as a mammalian cell. For example, a mammalian cell suitable for the present invention may be one or more selected from the group consisting of mouse cells (e.g., COP, L, C127, Sp2/0, NS-0, NS-1, At20, NIH3T3, etc.), rat cells (e.g., PC12, PC12h, GH3, MtT, etc.), hamster cells (e.g., BHK, CHO, CHO-K1, GS defective CHO, CHO-DUXB11, CHO-DG44, etc.), monkey cells (e.g., COS1, COS3, COS7, CVI, Vero, etc.), human cells (e.g., HeLa, HEK 293 cells, HEK 293 EBNA cells, Namalwa cells, retina-derived PER-C6, cells derived from diploid fibroblasts, myeloma cells, HepG2, etc.), hybridoma cells, embryonic stem cells, and fertilized egg cells, without being limited thereto. More preferably, the transformant may be a Chinese hamster ovary (CHO) cell, a rat myeloma cell, a baby hamster kidney (BHK) cell, a hybridoma cell, a Namalwa cell, an embryonic stem cell, or a fertilized egg cell, and most preferably, may be a Chinese hamster ovary (CHO) cell.

The present invention also provides a method for producing a protein of interest comprising a step of culturing a transformant comprising an expression cassette for producing the protein of interest. More preferably, the method may comprise steps of: transfecting cells with a vector that expresses the intron sequence and the protein of interest by a single promoter; selecting stably transfected cells; culturing the transfected cells under conditions suitable for expression of the protein of interest; and recovering the protein of interest from the cells or the cell culture. Insertion of the gene of the protein of interest is preferably performed by a method known to those skilled in the art. For culturing, it is preferable to use a culture medium suitable for the host cell. In addition, purification of the protein of interest is preferably performed by a method known to those skilled in the art.

In one embodiment of the present invention, the present invention provides a method for transient transformation with an expression vector containing an expression cassette and production of a protein of interest. After transient transduction of the expression vector into host cells using polyethylenimine (PEI), the transduced cells were cultured in an incubator at 30 to 37° C. under 5 to 8% $CO_2$ for 1 to 3 weeks to produce the protein of interest (see Example 1-2).

The present invention also provides a method for increasing the production of a protein of interest comprising steps of: a) preparing an expression-enhancing intron in which a splicing donor sequence, a branch sequence, a polyY sequence and a splicing acceptor sequence are combined with the expression-enhancing sequence represented by SEQ ID NO: 1: b) inserting the expression-enhancing intron, prepared in step a), into a vector; c) transforming a cell with the vector prepared in step b); and d) producing the protein of interest using the transformant prepared in step c).

Hereinafter, the present invention will be described in more detail with reference to examples. However, the following examples are for illustrating the present invention, and the scope of the present invention is not limited by the examples.

The examples of the present invention are intended to prepare an intron sequence capable of strongly expressing the gene of the protein of interest in combination with a promoter/enhancer, and to construct an expression cassette using the same, and to test the effect thereof.

Example 1. Preparation of Expression-Enhancing Sequence and Evaluation of Effect

Example 1-1. Preparation of Expression-Enhancing Intron

Expression-enhancing intron 1 (hereinafter referred to as EEI1) was prepared by combining a cytomegalovirus immediate early gene-derived sequence (SEQ ID NO: 1) containing a splicing donor sequence, an elongation factor 1 alpha promoter sequence-derived branch (SEQ ID NO: 4), and a poly Y tract and splicing acceptor sequence (SEQ ID NO: 7) through a PCR method, and cloned via PacI/HpaI sites into a MarEx vector (Korean Patent No. 10-1076602, hereinafter referred to as pCT) having dihydrofolate reductase (DHFR) as a selection marker, thereby constructing a pCT-EEI1 vector. The cloning method is well known in the art and is described, for example, in Maniatis, T., Fritsch, E. F. and Sambrook, J., Molecular Cloning: A laboratory manual, Cold Spring Harbor Laboratory Press, Cold Spring Harbor, New York (1989). The aflibercept gene sequence, developed as a vascular endothelial growth factor inhibitor, was cloned into the expression cassette of the pCT-EEI1 vector via HpaI/ClaI sites, thereby constructing a pCT-EEI1-Aflibercept vector expressing aflibercept.

Expression-enhancing intron 2 (hereinafter referred to as EEI2) was prepared by combining a cytomegalovirus immediate early gene-derived sequence (SEQ ID NO: 1) containing a splicing donor sequence, a human immunoglobulin sequence-derived branch (SEQ ID NO: 4), and a polyY tract and splicing acceptor sequence (SEQ ID NO: 8) through a PCR method, and then a pCT-EEI2-Aflibercept vector was constructed in the same manner as described above.

Expression-enhancing intron 3 (hereinafter referred to as EEI3) was prepared by combining a cytomegalovirus immediate early gene-derived sequence (SEQ ID NO: 1) containing a splicing donor sequence, a rabbit beta globin sequence-derived branch (SEQ ID NO: 5), and a polyY tract and splicing acceptor sequence (SEQ ID NO: 9) through a PCR method, and then a pCT-EEI3-Aflibercept vector was constructed in the same manner as described above.

Expression-enhancing intron 4 (hereinafter referred to as EEI4) was prepared by combining a cytomegalovirus immediate early gene-derived sequence (SEQ ID NO: 1) containing a splicing donor sequence, a mouse immunoglobulin sequence-derived branch (SEQ ID NO: 6), and a polyY tract and splicing acceptor sequence (SEQ ID NO: 10) through a PCR method, and then a pCT-EEI4-Aflibercept vector was constructed in the same manner as described above.

Next, *E. coli* DH5a (RBC Bioscience) was transformed with each of the constructed vectors to obtain vector DNAs.

The final vectors were obtained by confirming the sequence of the MarEx vector comprising the EEI sequence and the aflibercept gene sequence, and the final vector DNAs were obtained using the Endo-free plasmid maxi kit (Qiagen).

Example 1-2. Experiment on Expression of Aflibercept to Evaluate Effect of EEI CHO-K1 cells were transduced with each of an expression vector containing no EEI (control) and expression vectors containing EEI1 to EEI4, respectively, and the production of aflibercept for a short period of time through transient expression was measured. Host cells were transiently transduced with each of the expression vectors using polyethylenimine (PEI), and the transduced cells were cultured in an incubator at 30 to 37° C. under 5 to 8% $CO_2$ for 1 to 3 weeks to produce aflibercept. Aflibercept production was analyzed using a protein A biosensor with Octet (ForteBio), which is a bio-layer interferometry analysis system.

As a result, as shown in FIG. 2 and Table 1 below, it was confirmed that aflibercept production was 1.72 to 1.90 times higher in the expression vectors comprising EEI than in the control, and among these expression vectors, the expression vector comprising EEI4 exhibited the highest aflibercept production (1.90 times higher than the control.

TABLE 1

| No. | Sequences included in the expression vector | Relative aflibercept production compared to control | SEQ ID NO |
|---|---|---|---|
| 1 | Control | 1.0 time | — |
| 2 | EEI 1 | 1.74 times | SEQ ID NO: 20 |
| 3 | EEI 2 | 1.74 times | SEQ ID NO: 21 |
| 4 | EEI 3 | 1.72 times | SEQ ID NO: 22 |
| 5 | EEI 4 | 1.90 times | SEQ ID NO: 23 |

Example 2. Expression Vector Comprising EEI and BGH polyA Example 2-1. Construction of Expression Vector Comprising EEI and BGH polyA In order to optimize the expression cassette comprising EEI, cloning was performed in which the SV40 poly A signal sequence in each of the expression cassette composed of CMV promoter/enhancer+aflibercept+SV40 poly A signal sequence and the expression cassette composed of CMV promoter/enhancer+EEI4+aflibercept+SV40 poly A signal sequence was replaced with the BGH poly A signal sequence. Next, E. coli DH5a (RBC Bioscience) was transformed with each of the expression cassettes to obtain vectors.

The final vectors were obtained by confirming the sequence of the MarEx vector comprising the EEI4, BGH polyA and aflibercept gene sequences, and the final vector DNAs were obtained using the Endo-free plasmid maxi kit (Qiagen). The specific structures of the expression cassettes are shown in FIG. 3(A).

Example 2-2. Analysis of Aflibercept Production of Expression Vector Containing EEI and BGH polyA Each of the control expression vector (control) containing no EEI, the expression vector containing no EEI and having the BGH poly A signal sequence, the expression vector having the EEI4 and SV40 polyA signal sequences, and the expression vector having the EEI4 and BGH polyA signal sequences, constructed in Example 1, was transduced into CHO-K1 cells, and aflibercept production for a short period of time through transient expression was measured and compared. Aflibercept production was analyzed using a protein A biosensor with Octet (ForteBio), which is a bio-layer interferometry analysis system. As a result, as shown in FIG. 3(B) and Table 2 below, it was confirmed that aflibercept production was 2.25 times higher in the expression vector having the EEI4 and BGH poly A sequences than in the control.

Example 3. Expression Vector Comprising BGH polyA+Additional CMV P/E Sequences Example 3-1. Construction of Expression Cassettes Comprising BGH polyA+Additional CMV P/E Sequences To optimize the expression cassette containing EEI, additional CMV P/E was cloned to the end of the BGH poly A signal sequence in each of the expression cassette composed of CMV P/E+aflibercept+BGH poly A signal sequences and the expression cassette composed of CMV P/E+EEI4+aflibercept+BGH polyA signal sequences. Next, E. coli DH5a (RBC Bioscience) was transformed with each of the resulting vectors to obtain vector DNAs.

The final vectors were obtained by confirming the sequence of the MarEx vector containing the additional CMV P/E and aflibercept gene sequences, and the final vector DNAs were obtained using the Endo-free plasmid maxi kit (Qiagen). The specific structures of the expression cassettes are shown in FIG. 4(A).

Example 3-2. Analysis of Aflibercept Expression of Expression Cassette Containing BGH polyA+Additional CMV P/E Sequences Each of the control expression vector (control) composed of CMV P/E+aflibercept+BGH poly A signal sequences without EEI, the expression vector composed of CMV P/E+aflibercept+BGH polyA+CMV P/E signal sequences without EEI, the expression vector having the EEI4+BGH polyA signal sequence, and the expression vector having EEI4+BGH polyA signal sequence+CMV P/E was transduced into CHO-K1 cells, and aflibercept production for a short period of time through transient expression was measured and compared. Aflibercept production was analyzed using a protein A biosensor with Octet (ForteBio), which is a bio-layer interferometry analysis system.

Figure 4:
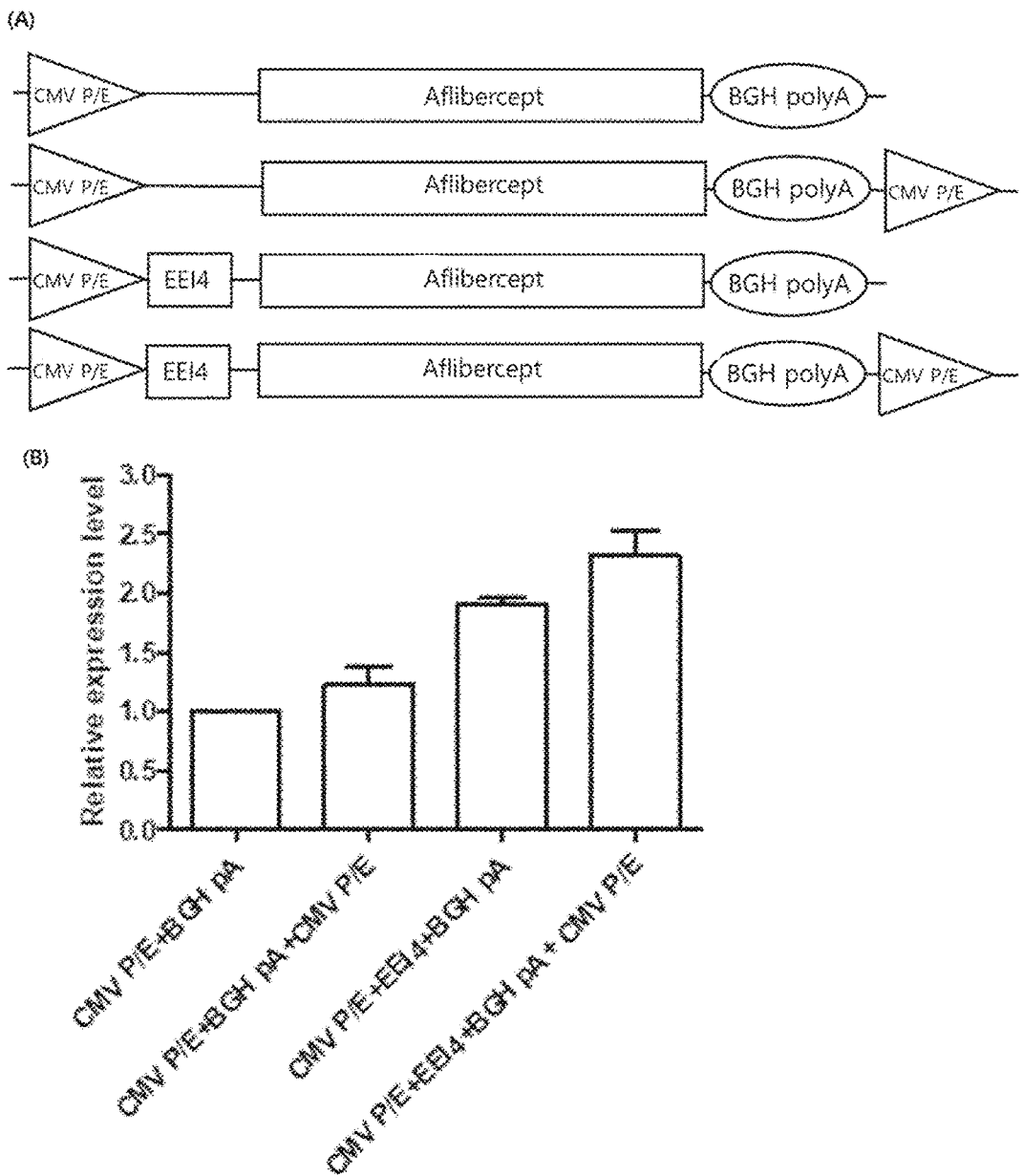
FIG. 4(A) is a schematic view illustrating an expression cassette composed of CMV P/E, aflibercept and BGH polyA (CMV P/E+BGH pA); an expression cassette composed of CMV P/E, aflibercept, BGH polyA, and CMV P/E added downstream of BGH poly A (CMV P/E+BGH pA+CMV P/E); an expression cassette composed of CMV P/E, expression-enhancing intron 4, aflibercept and BGH polyA (CMV P/E+EEI4+BGH pA); and an expression cassette composed of CMV P/E, expression-enhancing intron 4, aflibercept, BGH polyA, and CMV P/E added downstream of BGH polyA (CMV P/E+EEI4+BGH pA+CMV P/E).
FIG. 4(B) is a graph comparing the amounts of aflibercept produced for a short period of time through transient expression in CHO-K1 cells using expression vectors containing the four expression vectors, respectively.

As a result, as shown in FIG. 4(B) and Table 3 below, it was confirmed that aflibercept production was 2.32 times higher in the expression vector having the EEI4. BGH poly A signal sequence and additional CMV P/E sequence than in the control.

TABLE 2

| No. | Sequences included in the expression vector | Relative aflibercept production compared to control |
|---|---|---|
| 1 | CMV P/E + SV40 polyA | 1.0 time |
| 2 | CMV P/E + BGH polyA | 1.23 times |
| 3 | CMV P/E + EEI4 + SV40 polyA | 1.90 times |
| 4 | CMV P/E + EEI4 + BGH polyA | 2.25 times |

TABLE 3

| No. | Sequences included in the expression vector | Relative aflibercept production compared to control |
|---|---|---|
| 1 | CMV P/E + BGH polyA | 1.0 time |
| 2 | CMV P/E + BGH polyA + CMV P/E | 1.22 times |
| 3 | CMV P/E + EEI4 + BGH polyA | 1.90 times |
| 4 | CMV P/E + EEI4 + BGH polyA + CMV P/E | 2.32 times |

The invention claimed is:

1. An expression-enhancing intron, comprising:
   an expression-enhancing sequence comprising a splicing donor of SEQ ID NO: 1;
   a branch sequence of any one of SEQ ID NOs: 4 to 6; and
   a polyY sequence and a splicing acceptor of any one of SEQ ID NOs: 7 to 12.

2. The expression-enhancing intron of claim 1, wherein the expression-enhancing intron is any one of SEQ ID NOs: 20 to 23.

3. An expression cassette for producing a protein of interest comprising the expression-enhancing intron of claim 1, a promoter, an intron sequence, a polynucleotide encoding the protein of interest, and a polyA sequence.

4. The expression cassette of claim 3, wherein one or more expression-enhancing introns exist on a single protein-of-interest expression cassette.

5. The expression cassette of claim 3, wherein the expression-enhancing intron is comprised at one or more positions selected from the group consisting of the following positions:
   a) between the promoter and the polynucleotide encoding the protein of interest;
   b) between the polynucleotide encoding the protein of interest and the poly A; and
   c) inside the polynucleotide encoding the protein of interest.

6. The expression cassette of claim 3, wherein the promoter is a CMV promoter.

7. The expression cassette of claim 3, wherein the protein of interest is an antibody or a fragment thereof.

8. The expression cassette of claim 3, wherein the polyA sequence is SEQ ID NO: 13 or 14.

9. The expression cassette of claim 3, wherein the expression cassette has any one or more effects selected from the group consisting of the following effects by regulating intron splicing: an effect of promoting mRNA export out of the nucleus, and an effect of increasing an efficiency of translation of the protein of interest.

10. A vector containing the expression cassette for producing a protein of interest according to claim 3.

11. A transformant transformed with the vector of claim 10.

12. The transformant of claim 11, wherein the transformant is a eukaryotic cell.

13. A method for producing a protein of interest comprising a step of culturing the transformant of claim 11.

* * * * *